(12) United States Patent
Bieltz et al.

(10) Patent No.: US 9,272,692 B2
(45) Date of Patent: Mar. 1, 2016

(54) METHOD FOR SETTING THE CLAMPING FORCE EXERTED BY A PARKING BRAKE

(75) Inventors: Karsten Bieltz, Mudelsheim (DE); Simon Hauber, Freiberg Am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 128 days.

(21) Appl. No.: 13/994,524

(22) PCT Filed: Dec. 5, 2011

(86) PCT No.: PCT/EP2011/071767
§ 371 (c)(1),
(2), (4) Date: Aug. 27, 2013

(87) PCT Pub. No.: WO2012/080023
PCT Pub. Date: Jun. 21, 2012

(65) Prior Publication Data
US 2013/0338895 A1    Dec. 19, 2013

(30) Foreign Application Priority Data

Dec. 17, 2010   (DE) .......................... 10 2010 063 365

(51) Int. Cl.
| | | |
|---|---|---|
| *B60T 8/174* | (2006.01) | |
| *B60T 7/04* | (2006.01) | |
| *B60T 7/10* | (2006.01) | |
| *B60T 13/58* | (2006.01) | |
| *B60T 13/74* | (2006.01) | |

(52) U.S. Cl.
CPC ................ B60T 8/174 (2013.01); B60T 7/042 (2013.01); B60T 7/045 (2013.01); B60T 7/107 (2013.01); B60T 13/588 (2013.01); B60T 13/741 (2013.01)

(58) Field of Classification Search
CPC ... B60T 13/588; B60T 13/741; B60T 13/743; B60T 13/745; B60T 13/746; B60T 13/748
USPC .......................................................... 701/70
See application file for complete search history.

(56) References Cited

U.S. PATENT DOCUMENTS

| 6,311,808 B1 | 11/2001 | Halasy-Wimmer et al. |
|---|---|---|
| 2002/0027387 A1 | 3/2002 | Kubota |

FOREIGN PATENT DOCUMENTS

| CN | 1898110 | 1/2007 |
|---|---|---|
| DE | 103 45 485 | 4/2005 |
| DE | 103 61 042 | 5/2005 |
| JP | H 07-257346 | 10/1995 |
| JP | 2007-126032 | 5/2007 |

OTHER PUBLICATIONS

International Search Report for PCT/EP2011/071767, dated May 30, 2012.

*Primary Examiner* — Mussa A Shaawat
*Assistant Examiner* — Kyung Kim
(74) *Attorney, Agent, or Firm* — Kenyon & Kenyon LLP

(57) ABSTRACT

In a method for setting the clamping force, which is exerted by a parking brake, a portion of which clamping force is at least partially generated by an electromechanical braking device having an electric actuator, and another portion is additionally generated by an additional braking device, as needed, the actual force curve is determined and compared to a characteristic, defined force curve to determine the magnitude of the electromechanical clamping force to be supplied by the electric actuator. If the actual force curve corresponds to the characteristic force curve, then, in addition to the electromechanical clamping force, an additional clamping force of the additional braking device is also taken into account for obtaining the setpoint clamping force.

9 Claims, 2 Drawing Sheets

METHOD FOR SETTING THE CLAMPING FORCE EXERTED BY A PARKING BRAKE

BACKGROUND OF THE INVENTION

1. Field of the Invention

The present invention relates to a method for setting the clamping force exerted by a parking brake in a vehicle.

2. Description of the Related Art

German patent DE 103 61 042 B3 describes an electromechanical parking brake, which has an electric brake motor as an actuator, during the operation of which a brake piston having a brake pad is axially pressed against a brake disk. The magnitude of the clamping force is controlled via the supply of power to the brake motor.

In addition, it is known that electromechanical parking brakes may be combined with the hydraulic vehicle brake, in that the hydraulic pressure of the vehicle brake supportingly acts upon the brake piston, so that the clamping force is made up of an electromotive and a hydraulic portion.

BRIEF SUMMARY OF THE INVENTION

The present invention is based on the objective of reducing the load in an electromechanical parking brake, which acts in combination with an additional braking device.

The method of the present invention relates to an electromechanical parking brake in a vehicle, the electromechanical parking brake having an electric actuator as a control element, a clamping force for fixing the vehicle in position being able to be generated by the electric actuator. The actuator is preferably an electric brake motor, whose angular motion is converted to an axial positioning motion of a brake piston, which is a support for a brake pad that is pressed against the face of a brake disk.

The use of an electric brake motor as a brake actuator represents an advantageous embodiment. However, in principle, other electrically adjustable actuators may be considered, for example, electromagnetic actuators, which, in response to the application of an electric voltage, execute a mechanical adjusting movement, by which the brake piston having the brake pad is pressed against the brake disk.

The additional braking device is advantageously the hydraulic vehicle brake, whose hydraulic pressure acts upon the brake piston in a supporting manner. In general, the electromechanical braking device can provide the required clamping force without the assistance of the additional braking device. However, it may be advantageous to utilize the additional braking device, as needed, for generating a supplemental clamping force.

If a braking force is also generated by the additional braking device without a request by the parking brake or a control unit assigned to the parking brake, this may be considered for the clamping force to be set. For example, in hydraulic vehicle brakes, a supply pressure, which may provide a portion of the clamping force, may be generated via manipulation of the brake pedal by the driver. In order to be able to estimate the magnitude of the supporting braking force from the additional braking device using simple measures, and to take it into account for the overall clamping force, the present invention provides that the actual force curve of the electromechanical clamping force be determined during the closing operation and compared to a characteristic force curve. If the actual force curve corresponds to the characteristic force curve, then it may be assumed that an additional, supporting braking force, which may be utilized in addition to the electromechanical clamping force, is currently being generated in the additional braking device. In this manner, the electromechanical clamping force's share of the entire clamping force to be supplied may be reduced, which means that the load in the electromechanical braking device is lowered.

By comparing the actual force curve of the electromechanical clamping force to the known, characteristic force curve, which is specified as a characteristic curve, then, even without a measurement, it may be estimated if a braking force, which may be additionally used as a clamping force, is generated in the additional braking device.

A further advantage of the method of the present invention is that by utilizing the additional braking force, which is generated in the additional braking device, actuating times and, in addition, the noise generated during the actuation of the parking brake, may be reduced.

It may be useful to select different characteristic curves as characteristic force curves, to which the actual, measured force curve is compared. Each characteristic curve may be assigned a force level of the additional braking device, which force level may possibly be considered as a supporting clamping force.

In addition, only in the case of correspondence of the actual force curve to a characteristic force curve is it possible to assume that assistance from the additional braking device is sufficient, and to reduce the electromechanical clamping force accordingly, whereas in the event of a deviation from the characteristic curve in spite of the actual presence of an additional braking force, the entire clamping force for fixing the vehicle in position is generated by the electromechanical braking device.

In addition, when comparing the actual force curve to the characteristic force curve, it is possible to allow a defined tolerance band, which means that correspondence may be assumed when the actual force curve lies within the tolerance band of the characteristic force curve.

According to a useful further refinement, it is provided that only the region of the first force increase in the force curve be used for the comparison. The point of force increase, at which a clamping force starts to be supplied by the electromechanical braking device, may be determined using relatively simple measures. The curve of the electromechanical clamping force may be ascertained, for example, using the current characteristic of the electric actuator. In the case of an electric brake motor, in addition to, or as an alternative to, the current characteristic, the voltage characteristic or speed characteristic or any combination of these variables may also be used for determining the clamping force curve. The point of force increase constitutes a clearly defined and relatively accurately determinable point in the force curve.

According to a further advantageous embodiment, it is provided that the force curve of the additional braking device be used as a characteristic, defined force curve. The force curve determinable using state variables of a motor, such as current or voltage of the electric actuator, corresponds at least substantially, and at least in sections, to the general force curve of the additional braking device. In particular, play and elasticities of the additional braking device, which have an effect on its force curve, also influence the force curve, which is ascertained using the state variables of the motor of the electric braking device. In this manner, the current state of the additional braking device may be deduced from the actual force curve.

In the case of a hydraulic vehicle brake, which is used as an additional braking device, the hydraulic brake has characteristic spring stiffnesses and play, which results, for example, in different slopes in the pressure-volume characteristic of the hydraulic vehicle brake. In a first pressure range, the air gap of the hydraulic brake must initially be overcome, in that hydraulic volume is conveyed until the brake pads rest against the brake disk. In this range, volume increases sharply with respect to the pressure.

In a subsequent, second range, the compressibility of the brake pads and elastomers, such as an anti-noise coating in the hydraulic brake system, becomes apparent; in this second range, there is a transition from a progressively increasing volume per unit pressure to a volume that increases at an approximately constant rate.

In a further, third range having an even higher pressure, elastic deformation takes place, such as the bending-upwards of the fingers of the brake caliper, which engage over the brake disk. The curve of the volume as a function of the pressure is at least approximately linear.

The different regions of the volume-pressure characteristic may be converted to a force-displacement characteristic; in particular, the region of force increase for each section of the volume-pressure curve having a characteristic shape. Ascertaining the actual force curve while closing the parking brake, and comparing it to the characteristic curve, allows the applied braking force of the additional braking device to be estimated, as described above, and allows it to be taken into account in the generation of the entire clamping force.

The method of the present invention is executed in a closed-loop or open-loop control unit in the vehicle, which may be part of the parking brake system.

DETAILED DESCRIPTION OF THE INVENTION

Figure 1:
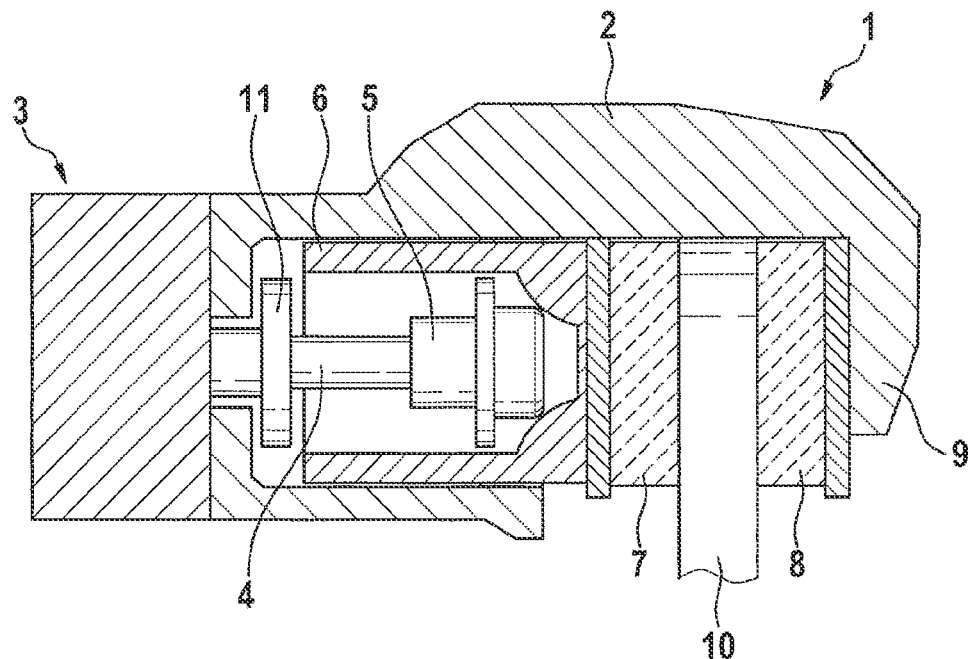
FIG. 1 shows a cross-section of an electromechanical parking brake for a vehicle, in which the clamping force is generated by an electric brake motor.

An electromechanical parking brake 1 for fixing a vehicle in position is represented in FIG. 1. Parking brake 1 includes a brake caliper 2 having a clamp 9, which engages over a brake disk 10. As an actuating mechanism, parking brake 1 has an electric motor as a brake motor 3, which causes a spindle 4 to rotate; a spindle part 5 being rotationally mounted on the spindle. When spindle 4 rotates, spindle part 5 is axially displaced. Spindle part 5 moves inside of a brake piston 6, which is a support for a brake pad 7 that is pressed against brake disk 10 by brake piston 6. On the opposite side of brake disk 10, there is a further brake pad 8 that is supported in a fixed manner at clamp 9.

Inside of brake piston 6, spindle part 5 may move axially forwards in the direction of brake disk 10 in response to rotation of spindle 4, and axially backwards, up to reaching a limit stop 11, in response to rotation of spindle 4 in an opposite direction. To generate a clamping force, spindle part 5 acts upon the inner end face of brake piston 6, through which the brake piston 6 supported in parking brake 1 in an axially displaceable manner is pressed, together with brake pad 7, against the facing surface of brake disk 10.

If necessary, the parking brake may be assisted by a hydraulic vehicle brake, which means that the clamping force is made up of an electromotive portion and a hydraulic portion. In the case of hydraulic assistance, the back side of the brake piston 6 facing the brake motor is acted upon by pressurized hydraulic fluid.

Figure 2:
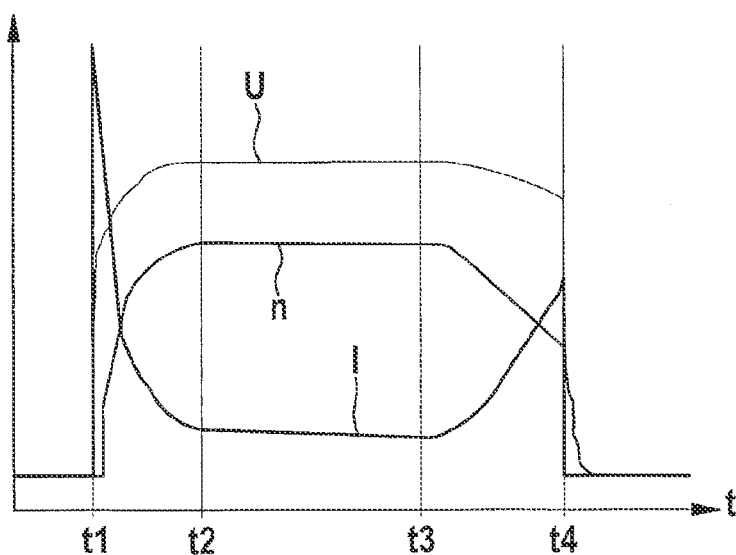
FIG. 2 shows a diagram including the curves of the current, the voltage and the motor speed versus time during the operation of applying the parking brake.

A diagram including the current characteristic I, voltage U and the speed characteristic n of the electric brake motor as a function of time for a brake-application operation is represented in FIG. 2. At time t1, the brake-application operation begins, in that an electrical voltage is supplied and a current is run through the brake motor with the circuit closed. At time t2, voltage U and motor speed n have reached their maximum. The phase between t2 and t3 represents the idling phase, in which current I moves to a minimum level. Following this from time t3 to time t4 is the force build-up phase, in which the brake pads rest against the brake disk and are pressed against the brake disk with increasing clamping force F. At time t4, the electric brake motor is switched off by opening the circuit, so that subsequently, speed n of the brake motor decreases to zero.

The point of force increase coincides with the phase of the force build-up at time t3. The force build-up or the curve of clamping force F may be ascertained, for example, with the aid of the curve of current I of the brake motor, which generally has the same shape as the electromechanical clamping force. Starting from the low level during the idling phase between t2 and t3, the current characteristic increases steeply at the beginning of time t3. This increase in the current may be detected and utilized for determining the point of force increase. However, in principle, the curve of the force build-up may also be determined from the voltage or speed characteristic, or from any combination of the current, voltage and speed signals.

In FIG. 2, the current characteristic is represented as a function of time. Using, for example, sensorially ascertained displacement information, the time-dependent curve may be converted into a displacement-dependent curve; the same applies to the curve of clamping force F, which corresponds to current I.

Figure 3:
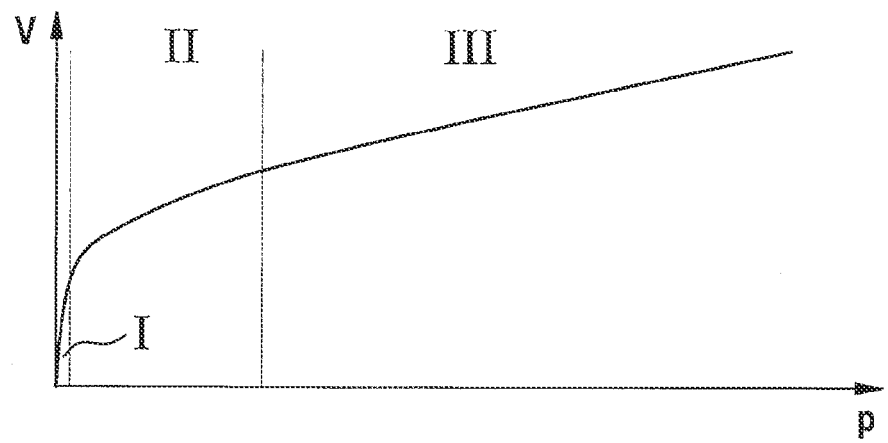
FIG. 3 shows a volume-pressure characteristic of a hydraulic vehicle brake, which is subdivided into three different regions.

In FIG. 3, a volume-pressure characteristic of the hydraulic vehicle brake is shown for illustrating the characteristic spring stiffness of the hydraulic brake in view of the elastic properties of the brake pads of the brake disk. The characteristic curve may be subdivided into three pressure-dependent regions I, II and III. First region I is valid for a low pressure interval between zero bar and, e.g., three bar; in this interval, the volume increases sharply. In region I, the air gap of the hydraulic brake is overcome; hydraulic volume must be displaced until the brake pads rest against the brake disk.

Region II follows region I, region II extending up to a hydraulic pressure of, e.g., 60 bar and being depictable as an nth order curve. In region II, the compressibility of the brake pads and elastomers used in the brake system, for example, an anti-noise coating, is expressed.

Region III, which is characterized by a linearly elastic behavior of brake components of the hydraulic brake system, follows region II. In region III, the fingers of the brake caliper that embrace the brake disk are bent upwards. In region III, the linear shape of the characteristic curve is determined, first and foremost, by the stiffness of the brake caliper or caliper.

Figure 4:
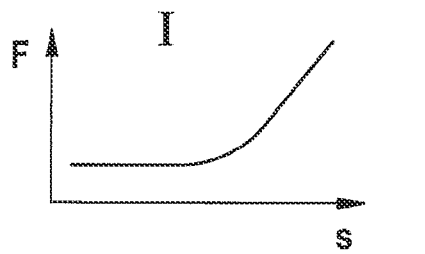
FIGS. 4 to 6 show in each instance, a force-displacement characteristic of the parking brake, FIG. 4 being associated with the first region, FIG. 5 being associated with the second region, and FIG. 6 being associated with the third region of the characteristic curve shown in FIG. 3.
Figure 5:
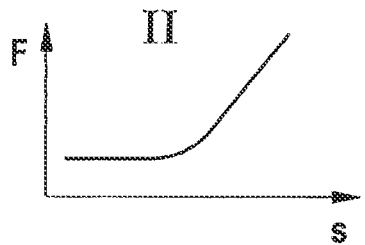
Figure 6:
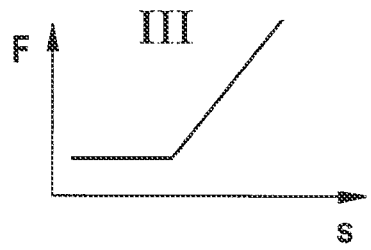

FIGS. 4 through 6 each show a force-displacement curve of the clamping force, which is exerted by the parking brake and is represented, in each instance, as a function of the actuator travel. The force curve according to FIG. 4 is associated with region I from FIG. 3, the force curve according to FIG. 5 is associated with region II, and the force curve according to FIG. 6 is associated with region III. The force curves in FIGS. 4 to 6 stand as examples for an actual force characteristic of the clamping force, which is exerted by the parking brake and may be determined, as described above, using the electromotive state variables current I, voltage U and/or motor speed n, for example.

As can be gathered from a comparison of the force curves, there is a characteristic difference in the point of force increase. An nth-order force build-up curve is shown in the force curves according to FIGS. 4 and 5, whereas according to FIG. 6, the force increases linearly. Using the determination of the nth-order, pressure-increase build-up behavior according to FIG. 4 or 5 or the linear increase according to FIG. 6, an association with regions I, II and III is possible, which means that a corresponding hydraulic supply pressure in the brake system may be deduced without the hydraulic pressure having to be directly known from a measurement. If, for example, the linear force-increase behavior of FIG. 6 is detected, then a high supply pressure of at least 60 bar may be inferred, whereas in the event of a force increase according to FIG. 4 or 5, a correspondingly lower hydraulic supply pressure is available in the system.

In order to assist the electromechanical braking device, the knowledge of the available hydraulic supply pressure may be used, via which a hydraulic portion of the clamping force may be supplied at the time of closing the parking brake. Using the rough classification in three different ranges, appropriate assignment of a hydraulic supply pressure is possible. In principle, in each instance, hydraulic clamping-force assistance of varying magnitude may consequently be assumed, in which case, for reasons of safety, it may be advantageous to assume that hydraulic clamping force assistance is available, and to correspondingly reduce the portion of electromechanical clamping force for reaching the total clamping force, for only a supply pressure ranging in region III. However, if a supply pressure in ranges I or II is detected, the portion of clamping force supplied hydraulically is disregarded; the entire clamping force is set, using the electromechanical braking device.

What is claimed is:

1. A method for setting a setpoint clamping force exerted by a parking brake, the parking brake having a first electromechanical braking device having an electric actuator, and a second braking device, wherein at least a portion of the setpoint clamping force is generated by the electromechanical braking device, the method comprising:
    determining an actual force curve and comparing the determined actual force curve to a characteristic defined force curve to determine a magnitude of the electromechanical clamping force supplied by the electric actuator; and
    if the actual force curve corresponds to the characteristic force curve, then, in addition to the electromechanical clamping force, an additional clamping force of the second braking device also being taken into account for obtaining the setpoint clamping force.

2. The method as recited in claim 1, wherein a region of increase in force of the electromechanical clamping force is used for the comparison between the actual force curve and the characteristic defined force curve.

3. The method as recited in claim 2, wherein the force curve of the second braking device is used as the characteristic defined force curve.

4. The method as recited in claim 3, wherein:
    multiple characteristic regions in the force curve of the second braking device are distinguishable; and
    in addition to the electromechanical clamping force, the additional clamping force of the second braking device is also taken into account for obtaining the setpoint clamping force only for the case in which the actual force curve corresponds to a selected characteristic region in the force curve of the second braking device.

5. The method as recited in claim 4, wherein the multiple characteristic regions in the force curve of the second braking device correspond to different spring stiffnesses of the second braking device.

6. The method as recited in claim 5, wherein the additional clamping force is only taken into account in the case of correspondence to the highest range of the spring stiffness.

7. The method as recited in claim 5, wherein a hydraulic vehicle brake is used as the second braking device.

8. The method as recited in claim 7, wherein:
    the hydraulic vehicle brake has a characteristic curve of the characteristic spring stiffness, including a first characteristic region associated with an air gap, a second characteristic region associated with a compressibility of brake pads, and a third characteristic region associated with a stiffness of a brake caliper; and
    the additional hydraulic clamping force is only taken into account for obtaining the setpoint clamping force in the case of correspondence to the third characteristic region.

9. A closed-loop or open-loop control unit for a parking brake in a vehicle, the control unit being configured to set a setpoint clamping force exerted by the parking brake, the parking brake having a first, electromechanical braking device having an electric actuator, and a second braking device, wherein at least a portion of the setpoint clamping force is generated by the electromechanical braking device, the control unit comprising:
    means for determining an actual force curve and comparing the determined actual force curve to a characteristic, defined force curve to determine a magnitude of the electromechanical clamping force supplied by the electric actuator; and
    means for determining the setpoint clamping force, wherein, if the actual force curve corresponds to the characteristic force curve, then, in addition to the electromechanical clamping force, an additional clamping force of the second braking device also taken into account for obtaining the setpoint clamping force.

* * * * *